US006178154B1

(12) United States Patent
Inata et al.

(10) Patent No.: US 6,178,154 B1
(45) Date of Patent: Jan. 23, 2001

(54) OPTICAL DISK DEVICE HAVING INCREASED HEIGHT AT AN OUTER PERIPHERY OF THE OPTICAL DISK

(75) Inventors: Masahiro Inata, Itami; Yoshito Saji, Nishinomiya; Masaomi Inoue, Onojo, all of (JP)

(73) Assignee: Matsushita Electric Industrial Co., Ltd., Kadoma (JP)

(*) Notice: Under 35 U.S.C. 154(b), the term of this patent shall be extended for 0 days.

(21) Appl. No.: 09/246,054

(22) Filed: Feb. 8, 1999

(30) Foreign Application Priority Data

Feb. 13, 1998 (JP) .................................. 10-031003

(51) Int. Cl.[7] ............................ G11B 17/30; G11B 17/00
(52) U.S. Cl. ............................................. 369/219; 369/244
(58) Field of Search ................................. 369/219, 215, 369/77.1, 77.2, 75.1, 75.2, 244

(56) References Cited

U.S. PATENT DOCUMENTS

| 5,777,978 | * | 7/1998 | Ota et al. | 369/219 |
| 5,870,367 | * | 2/1999 | Yamamori | 369/75.1 |
| 5,982,735 | * | 11/1999 | Tsai | 369/219 |
| 5,995,479 | * | 11/1999 | Takizawa | 369/219 |
| 6,014,357 | * | 1/2000 | Watanabe et al. | 369/75.2 |

FOREIGN PATENT DOCUMENTS

| 10-116479 | | 5/1998 | (JP) . |
| 11-66569 | * | 3/1999 | (JP) . |

* cited by examiner

Primary Examiner—David L. Ometz
Assistant Examiner—Kenneth W Fields
(74) Attorney, Agent, or Firm—Renner, Otto, Boisselle & Sklar LLP

(57) ABSTRACT

An optical disk device of the present invention includes an optical pickup which performs at least recording or reproduction of signals on or from an optical disk; a guiding section which supports and guides the optical pickup along the radial direction of the optical disk; an upper cover which protects the guiding section; a lower cover which protects the guiding section; and a base which supports the guiding sections therein. A height between the upper cover and the lower cover adjacent to an outer periphery of the optical disk is greater than a height between the upper cover and the lower cover adjacent to an inner periphery of the optical disk.

8 Claims, 12 Drawing Sheets

OPTICAL DISK DEVICE HAVING INCREASED HEIGHT AT AN OUTER PERIPHERY OF THE OPTICAL DISK

BACKGROUND OF THE INVENTION

1. Field of the Invention

The present invention relates to an optical disk device for recording or reproduction of signals on or from disk-type recording media such as DVD (Digital Video Disk). More specifically, the present invention relates to a small and/or thin optical disk device used as a peripheral device of a home video appliance or a computer.

2. Description of the Related Art

The typical optical disk devices represented by CD-ROM drives have increasingly become smaller and thinner so as to be installed in notebook type personal computers.

In general, when an optical disk device is intended to be made smaller and thinner, it is difficult to secure a sufficient clearance such as space for mechanical vibration or actuation because space for mounting elements which constitute the optical disk device is limited.

One exemplary product of conventional small, thin optical disk devices whose space for mounting the elements is limited is a CD-ROM drive having a height of 12.7 mm, which is incorporated in notebook type personal computers, and has already been put on the market.

The CD-ROM drive having a height of 12.7 mm includes an optical pickup, a disk motor having a disk clamp mechanism, a base chassis which supports the optical pickup and the disk motor, a tray which includes circuits and the like therein and supports the base chassis via a damper, an exterior package which supports the tray which is slidable back and forth, and a wiring element which connects the optical pickup and a main body.

Recently, DVDs having a recording capacity which is eight times as large as that of CDs have received attention. DVD players employing an optical disk which is based on a DVD format and DVD-ROMs have just been distributed in the market.

In general, if the optical axis of an object lens is tilted with respect to the recording surface of an optical disk, wave aberration is generated in proportion to the third power of a numerical aperture (NA) of the optics. In DVD, the numerical aperture of the optics of the optical pickup, which performs high-density recording and reproduction, is set to be 0.6 so as to be larger than the numerical aperture of CDs (0.45). Thus, even a slight tilt with respect to the optical axis causes a great jitter.

Therefore, the optical disk devices for DVDs require a mechanism for adjusting a tilt angle (i.e., an angle between the optical axis of the optical pickup and the recording surface of the disk) in order to eliminate jitters. The tilt angle can be adjusted by tilting the disk motor, by tilting the optical pickup or by tilting the guiding axis. The mechanism which tilts the disk motor or the optical pickup has a low adjusting sensitivity, whereas the mechanism which tilts the guiding axis has a comparatively high adjusting sensitivity.

An optical disk device having such a function is disclosed in the previously filed Japanese Laid-Open Publication 10-116479. In the optical disk device disclosed in Japanese Laid-Open Publication 10-116479, the ends of main and minor shafts adjacent to the outer periphery of the optical disk, which support the movement of the optical pickup in the radial direction of the disk, are adjustable in a direction generally perpendicular to the surface of the optical disk.

Also, the radial tilt angle and the tangential tilt angle are adjusted respectively by the fluctuation of the major shaft and the minor shaft where the optical pickup is kept above at the position in the middle of the radius of the optical disk.

The above described CD-ROM drive, having a height of 12.7 mm, does not have the above described mechanism for adjusting the tilt angle. Therefore, such an optical disk device has a drawback of being unable to perform recording and reproducing for recording media which have high density and large capacity, such as DVDs.

An object of the present invention is to solve the above described problems by providing a small, thin optical disk device which can be mounted in notebook computers.

SUMMARY OF THE INVENTION

According to one aspect of the present invention, an optical disk device includes an optical pickup which performs at least recording or reproduction of signals on or from an optical disk; a guiding section which supports and guides the optical pickup along the radial direction of the optical disk; an upper cover which protects the guiding section; a lower cover which protects the guiding section; and a base which supports the guiding sections therein; wherein, a height between the upper cover and the lower cover adjacent to an outer periphery of the optical disk is greater than a height between the upper cover and the lower cover adjacent to an inner periphery of the optical disk.

In one embodiment of the present invention, the guiding section can adjust a tilt angle between an optical axis of the optical pickup and a recording surface of the optical disk.

In another embodiment of the present invention, a portion of the lower cover most distant from a surface of the optical disk for recording and reproducing signals, in a direction perpendicular to the surface, is located adjacent to the outer periphery of the optical disk.

In still another embodiment of the present invention, the optical disk device further includes a tray on which the optical pickup, the guiding section, the upper cover, the lower cover and the base are mounted; a casing which removably receives the tray; and an interconnection element which is provided in the casing; wherein the interconnection element is provided so that the interconnection element does not exist in the most distant portion of the lower cover when the tray is placed in the casing.

In still another embodiment of the present invention, the interconnection element is bent in a U-shape when the tray is placed in the casing.

In still another embodiment of the present invention, at least either a signal to be recorded in the optical disk or a signal to be reproduced from the optical disk is transmitted through the interconnection element.

In still another embodiment of the present invention, the upper cover has a step in an area outside the outer periphery of the optical disk.

In still another embodiment of the present invention, the optical disk device further includes a motor for rotating the optical disk.

Thus, the invention described herein makes possible the advantage of providing a small, thin optical disk device which can be mounted in notebook computers.

This and other advantages of the present invention will become apparent to those skilled in the art upon reading and understanding the following detailed description with reference to the accompanying figures.

DESCRIPTION OF THE PREFERRED EMBODIMENTS

Hereinafter, one embodiment of the optical disk device according to the present invention will be described with reference to accompanying drawings.

Figure 1:
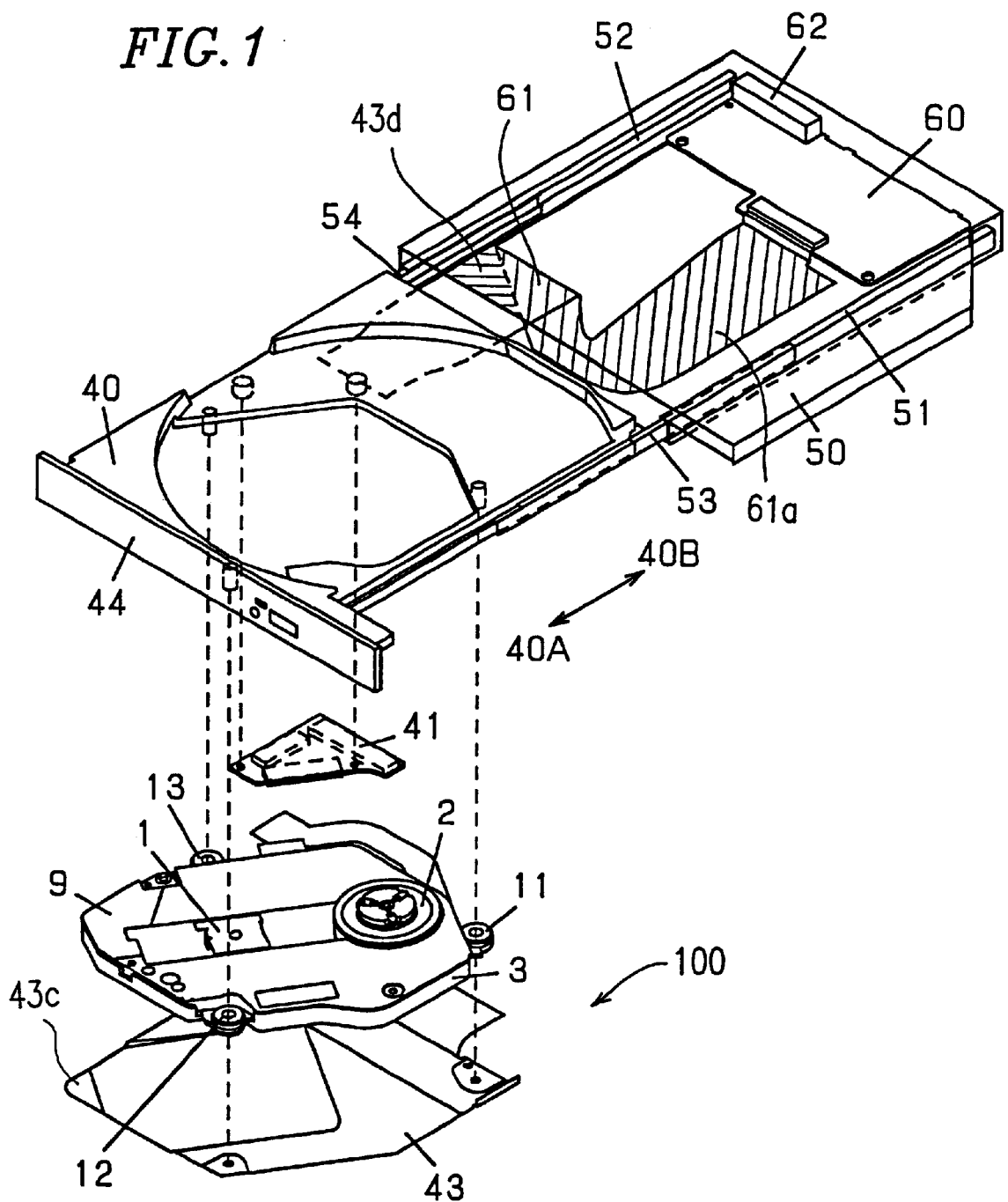
FIG. 1 shows one embodiment of an optical disk device according to the present invention.
Figure 2:
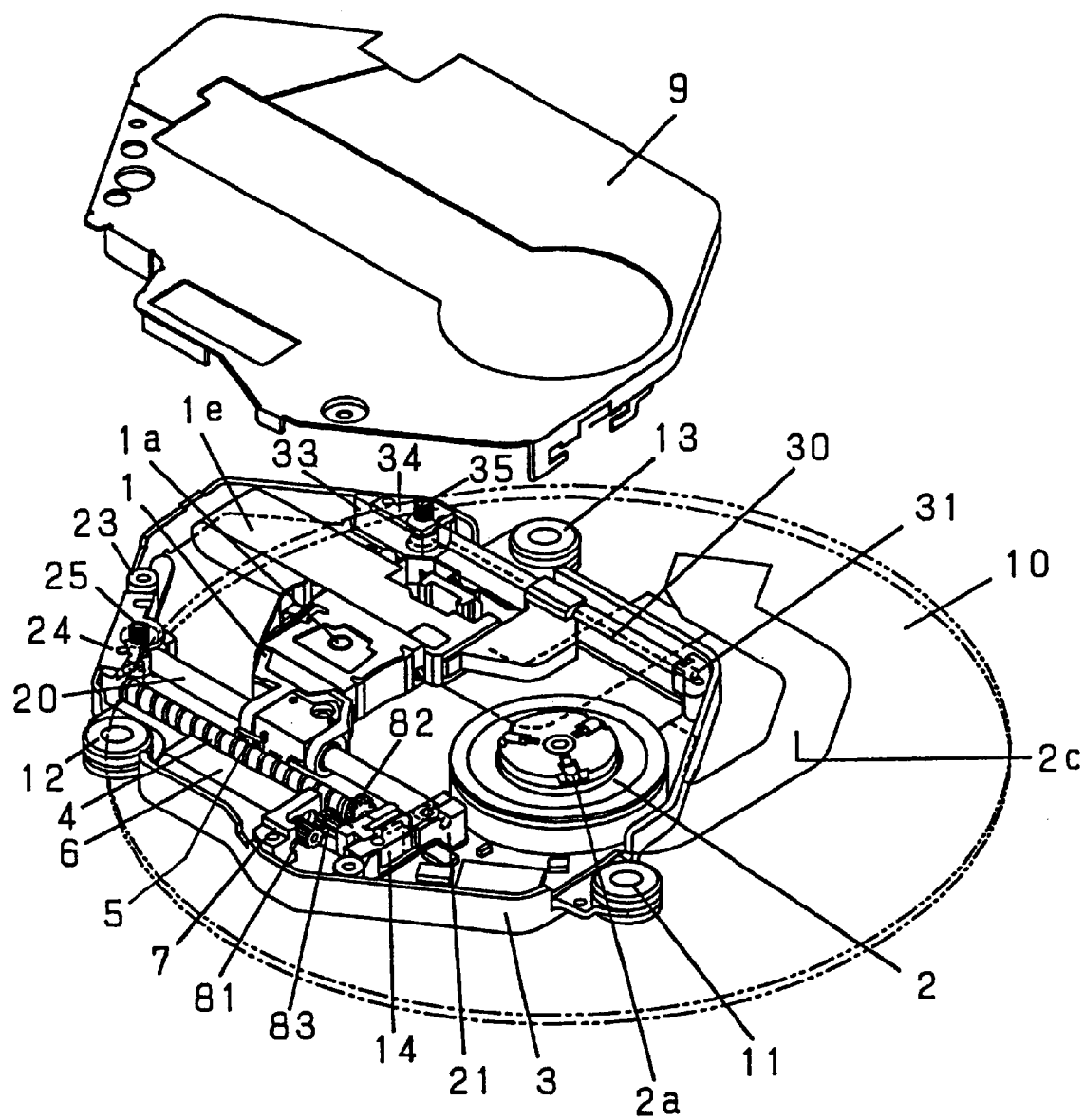
FIG. 2 is a partial exploded perspective view showing a configuration of an optical pickup transfer system and a base chassis including a disk motor.

FIG. 1 and FIG. 2 show one embodiment of the optical disk device according to the present invention.

The optical disk device 100 in FIGS. 1, 2, 5 and 6 includes an optical pickup 1, guiding section 20, 26, 30, 36, an upper cover 9, a lower cover 43 and a base chassis 3.

The optical pickup 1 performs at least either recording or reproduction of signals on or from an optical disk 10.

The guiding section 20, 26, 30 and 36 support the optical pickup 1 and guide the optical pickup 1 along the radial direction of an optical disk 10. Furthermore, the guiding section 20, 26, 30 and 36 can adjust the tilt angle between the optical disk 10 and the optical pickup 1. Hereinafter, the guiding element 20 is referred to as a major shaft 20, the guiding element 30 is referred to as a minor shaft 30, the guiding element 26 (FIG. 5) is referred to as a major shaft adjusting mechanism 26, and the guiding element 36 (FIG. 6) is referred to as a minor shaft adjusting mechanism 36. The major shaft 20 supports the optical pickup 1, and guides an objective lens 1a of the optical pickup 1, through which light comes in and goes out, so as to move the optical pickup 1 between the inner periphery and the outer periphery of the disk 10 in a radial direction of the disk 10. The minor shaft 30 is provided to be generally parallel to the major shaft 20, and supports the optical pickup 1. In other words, the optical pickup 1 is allowed to move along the major shaft 20 and minor shaft 30.

The upper cover 9 may protect at least a portion of the major shaft 20 and the minor shaft 30. For example, the upper cover 9 may cover any components except the optical pickup 1, which are located in the base chassis 3. Hereinafter, the upper cover 9 is referred to as a base cover 9.

The lower cover 43 is provided so as to face the base cover 9. As shown in FIG. 1, the lower cover 43 may protect the components located in the base chassis 3. In other words, the lower cover 43 may cover components which are located in the base chassis 3. Hereinafter, the lower cover 43 is referred to as a tray cover 43.

In the present embodiment, the height between the base cover 9 and the tray cover 43 adjacent to the outer periphery of the optical disk 10 is greater than the height between the base cover 9 and the tray cover 43 adjacent to the inner periphery of the optical disk 10. For example, the height between the base cover 9 and the tray cover 43 corresponding to the outer periphery of the optical disk 10 is greater than the height between the base cover 9 and the tray cover 43 corresponding to the inner periphery of the optical disk 10. Thus, in the present embodiment, the tilt angle can be easily adjusted.

The optical pickup 1, the major shaft 20 and the minor shaft 30 are located in the base chassis 3. The base chassis 3 supports the major shaft 20 and the minor shaft 30. For example, a major shaft supporting element 21 fixed to the base chassis 3 may support the end of the major shaft 20 adjacent to the inner periphery of the optical disk 10, while a minor shaft supporting element 31 fixed to the base chassis 3 may support the end of the minor shaft 30 adjacent to the outer periphery of the optical disk 10.

The optical disk device 100 may further include a disk motor 2 which turns the optical disk 10. In other words, the optical disk device 100 need not necessarily include a disk motor 2 because some of notebook type personal computers may already have a disk motor therein. The optical disk device 100 may further include all or some of elements shown in FIG. 2.

Hereinafter, the configuration of the optical disk device 100 shown in FIG. 2 will be described.

FIG. 2 is a partially exploded perspective view which shows a configuration of an optical pickup transfer system and a base chassis including the disk motor therein.

The disk motor 2 includes a disk grasping mechanism 2a for grasping the optical disk 10. A stator portion of the disk motor 2 is fixed to the base chassis 3. Furthermore, an interconnection element (FPC) 2c of the disk motor 2 may be pasted on the first surface of the base chassis 3. Furthermore, an interconnection element (FPC) 1e of the optical pickup 1 may be pasted on the second surface of the base chassis 3.

Herein, the first surface means a surface on which the stator portion of the disk motor 2 is fixed. The second surface means a surface to be protected by the tray cover 43. The disk motor 2 may not be necessarily covered with the base cover 9.

An actuation system can move the optical pickup 1 along the major shaft 20 and the minor shaft 30. For example, the actuation system may include a motor 6, a motor bracket 7 which fixes the motor 6 to the base chassis 3, a motor gear 81 fixed to an output shaft of the motor 6, a screw shaft 4, a screw gear 82 fixed to the screw shaft 4 and an intermediate gear 83 fixed rotatable to the major shaft supporting element 21. The body of the motor 6 need not to be covered with the base cover 9 and/or the tray cover 43.

The screw shaft 4 is provided to be parallel to the major shaft 20. The screw shaft 4 has a spiral groove on its surface. A gear element 5 is attached to the optical pickup 1 so as to engage it with the screw shaft 4. In order to eliminate the unnecessary axial play of the screw shaft 4, an elastic member, e.g., a thrust spring 14, is applied to the end of the major shaft supporting element 21.

As shown in FIG. 1, the optical disk device 100 may be fixed to the tray 40. For example, in order to relax an external impact applied to the optical disk device 100, the optical disk device 100 may be attached to the tray 40 via dampers 11, 12 and 13.

The tray 40 may be placed in a casing 50. The casing 50 may be made of sheet metal. For example, a U-shaped rail guides 51 and 52 are attached to the casing 50. The rail guides 51 and 52 are attached to the inner surface of the casing 50 which faces the rail guide 52.

The rail guides 51 and 52 guide the movement of rails 53 and 54 in the direction along an arrow 40A or 40B. The tray 40, which is guided by the rails 53 and 54, is slidable in the direction along the arrow 40A or 40B. The rails 53 and 54 are relatively slidable with respect to the rail guides 51 and 52 and relatively slidable with respect to the tray 40.

The interconnection element 1e coupled to the optical pickup 1 and the interconnection element 2c coupled to the disk motor 2 are connected to a intermediate board 41 which is fixed to a back surface of the tray 40.

When the tray 40 is placed in the casing 50, a cover 44 covers an opening of the casing 50 and allows for the tray 40 to be inserted therethrough.

Furthermore, the casing 50 may include a main board 60, an interconnection element (FPC) 61 and an outer connector 62.

The outer connector 62 is provided on the main board 60 and on the rear side of the casing 50. The outer connector 62 is used for transmitting signals between the outside of the casing 50 and the main board 60. The main board 60 is fixed to deep inside of the casing 50. Deep inside, as used herein means the area, away from the opening for inserting the tray 40, which is adjacent to an inner face of the casing 50 facing the opening.

Figure 3:
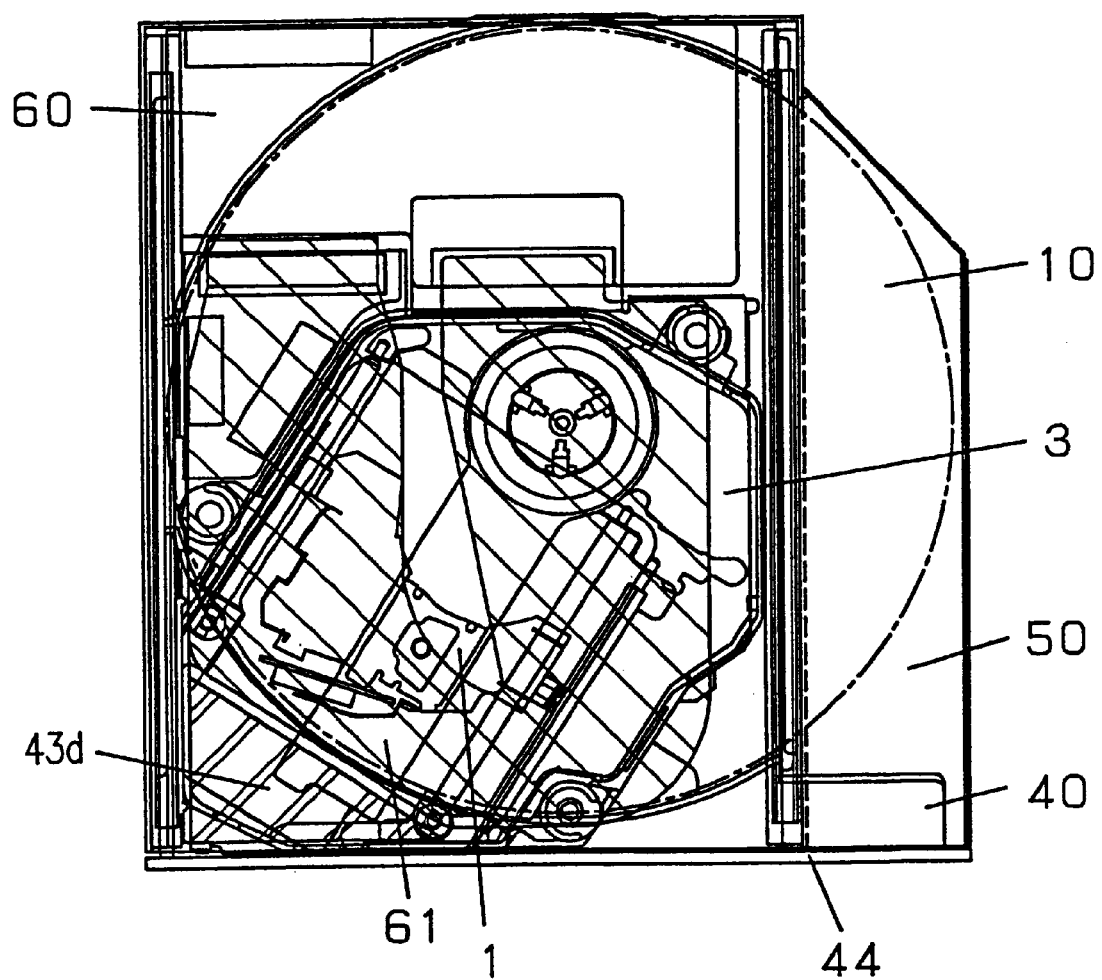
FIG. 3 shows a state of an interconnection element (FPC) 61 when a tray 40 is placed in a casing 50.
Figure 4:
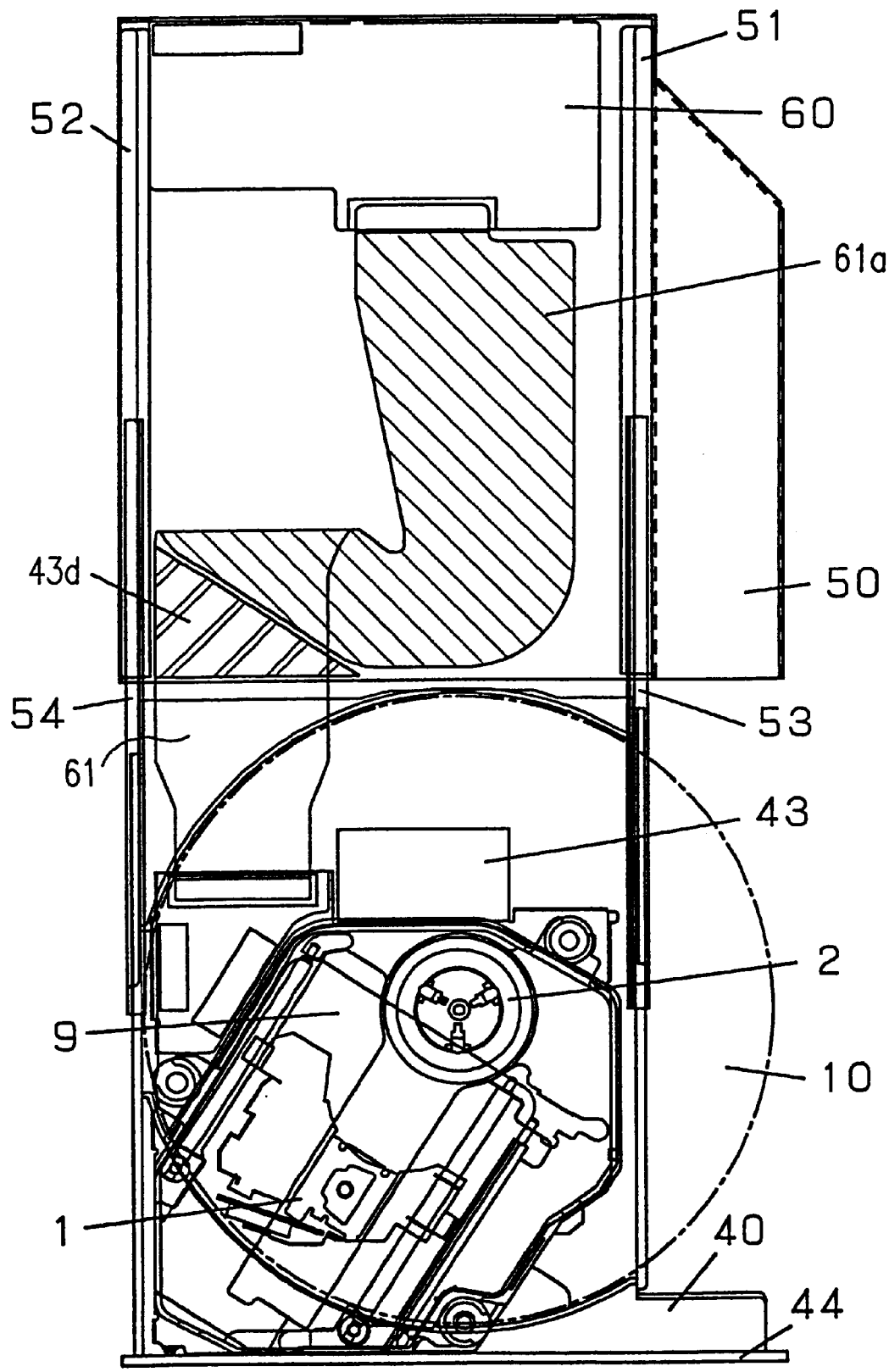
FIG. 4 shows a state of the interconnection element (FPC) 61 when the tray 40 is pulled out of the casing 50.

The interconnection element (FPC) 61 connects the main board 60 to the intermediate board 41. A part of the interconnection element (FPC) 61 is pasted on the casing 50 so that the interconnection element (FPC) 61 is not rubbed by the casing 50 and/or caught in the tray 40 when the tray 40 slides. The interconnection element (FPC) 61 is bent in a deformed U-shape between a paste region 61a and the intermediate board 41. The state of the interconnection element (FPC) 61 is shown in FIGS. 3 and 4. FIG. 3 shows the state of the interconnection element (FPC) 61 when the tray 40 is placed in the casing 50. FIG. 4 shows the interconnection element (FPC) 61 when the tray 40 is pulled out of the casing 50.

As described above, the ends of the major shaft 20 and the minor shaft 30 adjacent to the inner periphery of the optical disk 10 are supported by the major shaft supporting element 21 and the minor shaft supporting element 31 respectively. The configuration of the ends of the major shaft 20 and the minor shaft 30 adjacent to the outer periphery of the optical disk 10 will be described with reference to FIGS. 5 and 6.

Figure 5:
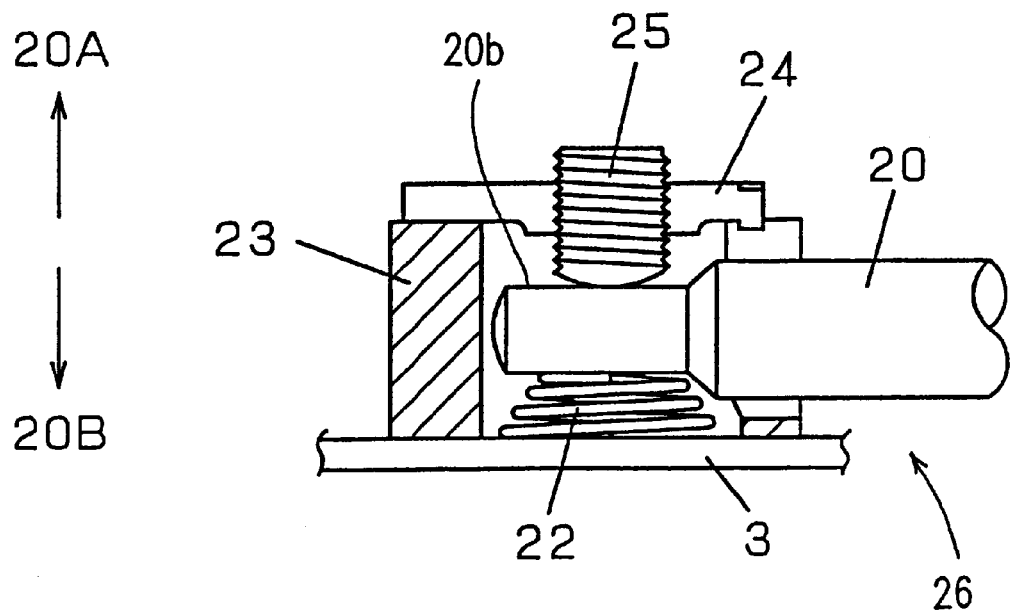
FIG. 5 shows a major shaft adjusting mechanism 26.

FIG. 5 shows a major shaft adjusting mechanism 26.

The major shaft adjusting mechanism 26 adjusts the tilt angle between the optical axis of the optical pickup 1 and the recording surface of the optical disk. The major shaft adjusting mechanism 26 includes the major shaft 20, a major shaft coil spring 22, a major shaft bracket 23, a major shaft cover 24 and a major shaft adjusting screw 25.

The major shaft coil spring 22 is located between the base chassis 3 and an end 20b of the major shaft 20 and urges the end 20b of the major shaft 20 in the direction of arrow 20A. The major shaft bracket 23 supports the end 20b of the major shaft 20. In other words, the major shaft 20 is supported so as to be movable in a direction normal to the base chassis 3 (i.e., in the directions of arrows 20A or 20B).

The major shaft bracket 23 fixed to the base chassis 3 holds the main coil spring 22. The major shaft cover 24 is fixed to the major shaft bracket 23 so as to cover the end 20b of the major shaft 20 and the major shaft coil spring 22. The major shaft cover is, for example, sheet metal.

The major shaft adjusting screw 25 sandwiches the end 20b of the major shaft 20 with the major shaft coil spring 22. By turning the major shaft adjustment screw 25, the major shaft 20 is adjusted in a direction normal to the base chassis 3 (i.e., in the directions of arrows 20A or 20B).

Figure 6:
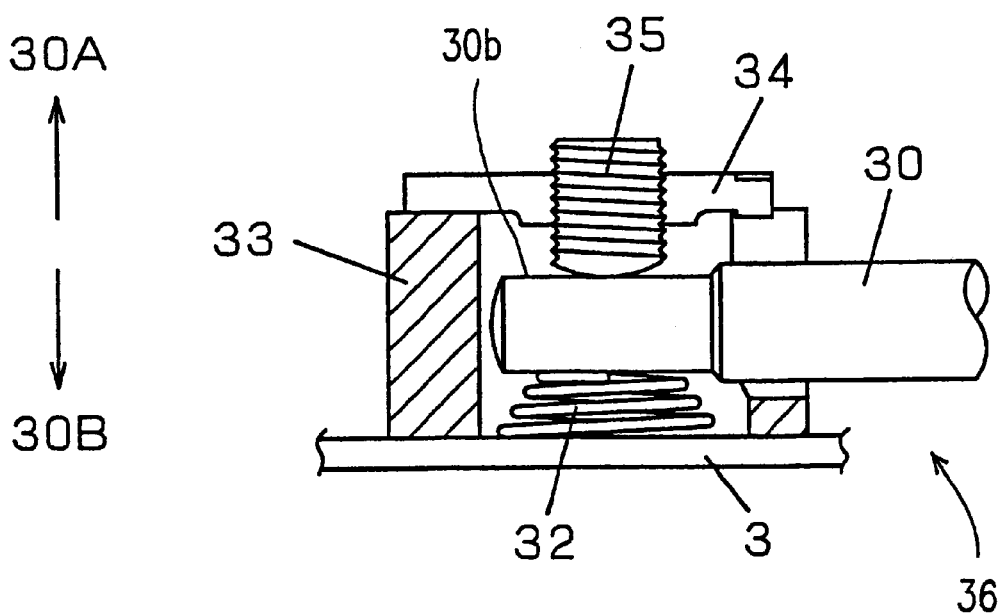
FIG. 6 shows a minor shaft adjusting mechanism 36.

FIG. 6 shows a minor shaft adjusting mechanism 36.

The minor shaft adjusting mechanism 36 adjusts the tilt angle between the optical axis of the optical pickup 1 and the recording surface of the optical disk 10. The minor shaft adjusting mechanism 36 includes the minor shaft 30, a minor shaft coil spring 32, a minor shaft bracket 33, a minor shaft cover 34 and a minor shaft adjusting screw 35.

The minor shaft coil spring 32 is located between the base chassis 3 and an end 30b of the minor shaft 30, and urges the end 30b of the minor shaft 30 in the direction of arrow 30A. The minor shaft bracket 33 supports the end 30b of the minor shaft 30. In other words, the minor shaft 30 is supported so as to be movable in a direction normal to the base chassis 3 (i.e., in the direction of arrows 30A or 30B).

The minor shaft bracket 33 fixed to the base chassis 3 holds the sub coil spring 32. The minor shaft cover 34 is fixed to the minor shaft bracket 33 so as to cover the end 30b of the minor shaft 30 and the minor shaft coil spring 32. The minor shaft cover is, for example, sheet metal.

The minor shaft adjusting screw 35 sandwiches the end 30b of the minor shaft 30 with the minor shaft coil spring 32. By turning the minor shaft adjustment screw 35, the minor shaft 30 is adjusted in a direction normal to the base chassis 3 (i.e., in the direction of arrows 30A or 30B).

Hereinafter, with reference to FIGS. 7A through 7C, the reason why the tilt angle can be sufficiently adjusted by setting a height h2 between the base cover 9 and the tray cover 43 adjacent to the outer periphery of the optical disk 10 so as to be greater than a height h1 between the base cover 9 and the tray cover 43 adjacent to the inner periphery will be described.

Figure 7A:
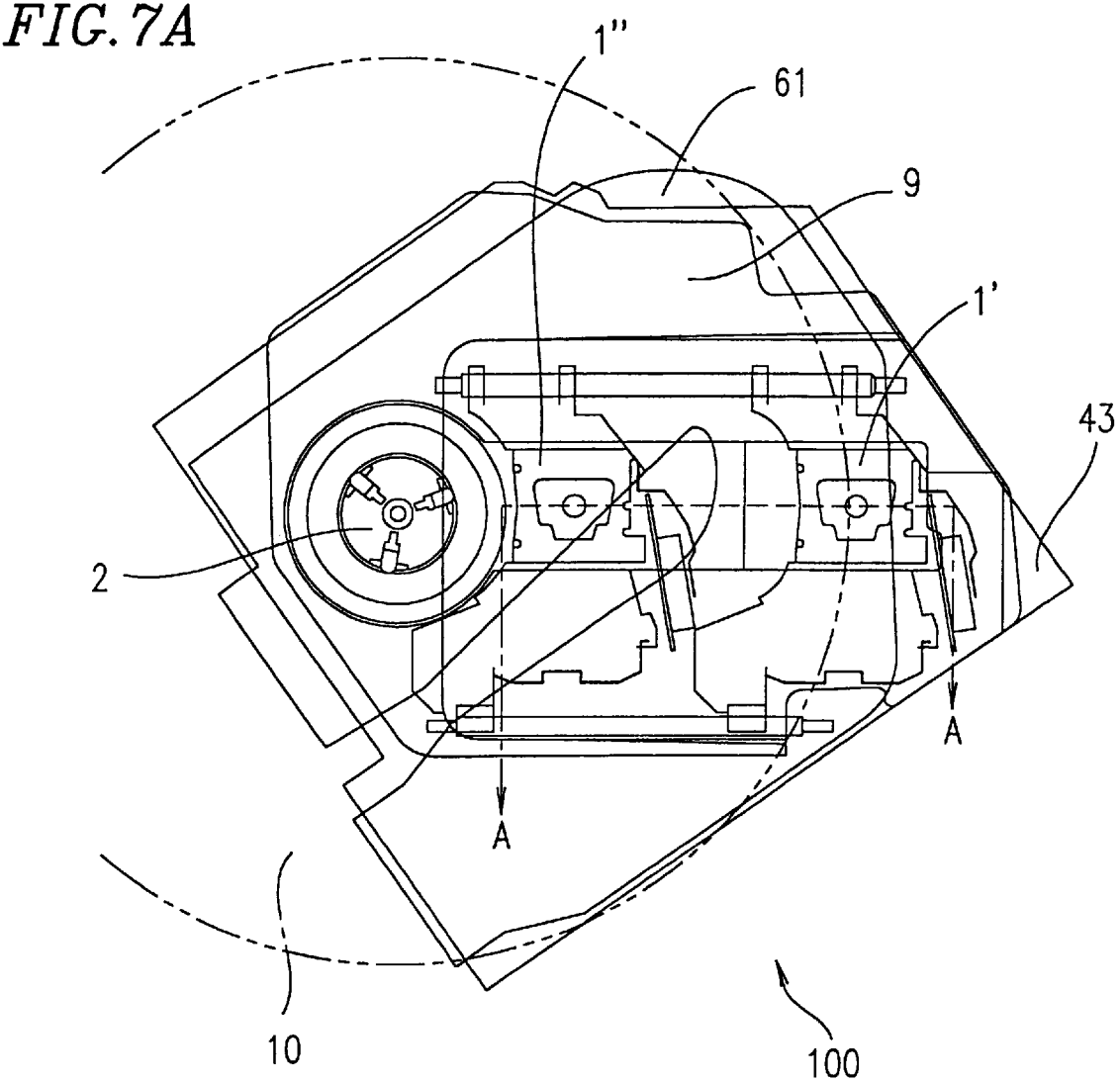
FIG. 7A is a top view of the optical disk device 100.

FIG. 7A shows the optical disk device 100 viewed from above in the mounting direction of the optical disk 10. FIG. 7B and 7C are cross sectional views of the optical disk device 100 taken along A—A line shown in FIG. 7A.

As shown in FIG. 7A, an optical pickup in the position adjacent to the outer periphery of the optical disk 10 is referred to as an optical pickup 1', and an optical pickup in the position adjacent to the inner periphery of the optical disk 10 is referred to as an optical pickup 1".

Figure 7B:
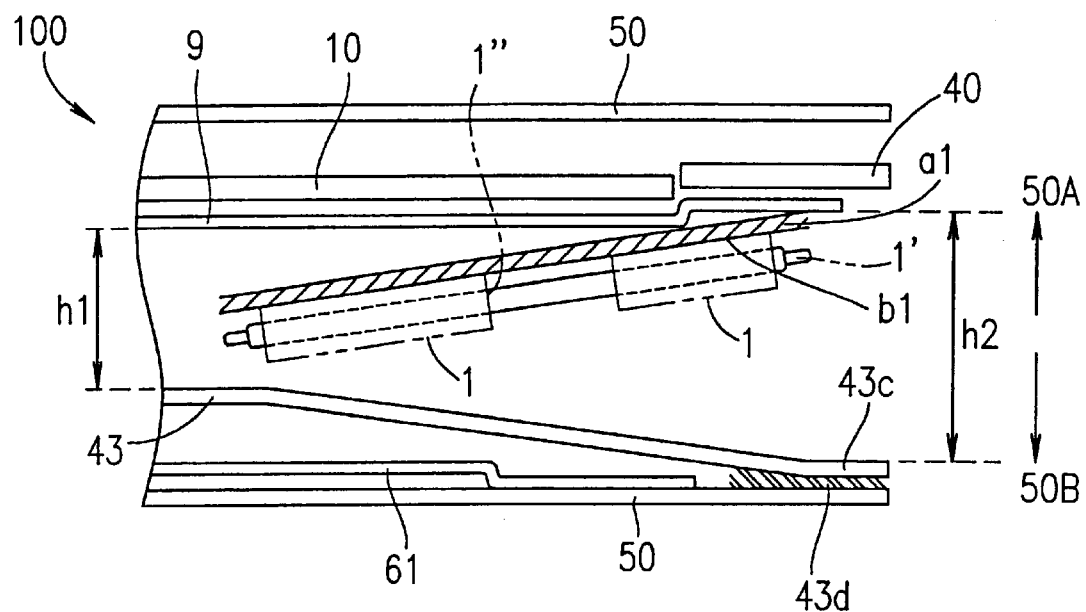
FIG. 7B is a cross-sectional view of the optical disk device 100 taken along line A—A in FIG. 7A.

For example, when the major shaft adjusting screw 25 in the major shaft adjusting mechanism 26 is turned so that the major shaft 20 moves in the direction along the arrow 20A as shown in FIG. 5, and the minor shaft adjusting screw 35 in the minor shaft adjusting mechanism 36 is turned so that the minor shaft 30 moves in the direction along the arrow 30A as shown in FIG. 6, in order to limit the tilt angle within the reference range, the optical pickup 1 moves along a moving orbital surface b1 as shown in FIG. 7B.

Herein, a space a1 formed generally in parallel with the moving orbital surface b1 is secured as a clearance. In the present embodiment, a portion of the base cover 9 not for mounting the optical disk 10 may be closer to the tray 40 than a portion of the base cover 9 for mounting the optical disk 10. In other words, the base cover 9 may have a step on its surface for mounting the optical disk 10.

Therefore, the space a1 is formed between the optical pickup 1' and the base cover 9, and even when the optical pickup 1 raised by the major shaft adjusting mechanism 26 and/or the minor shaft adjusting mechanism 36 moves toward the outer periphery of the optical disk 10, the optical pickup 1 is smoothly transferred without contacting the base cover 9. As a result, the tilt angle is sufficiently adjustable.

Figure 7C:
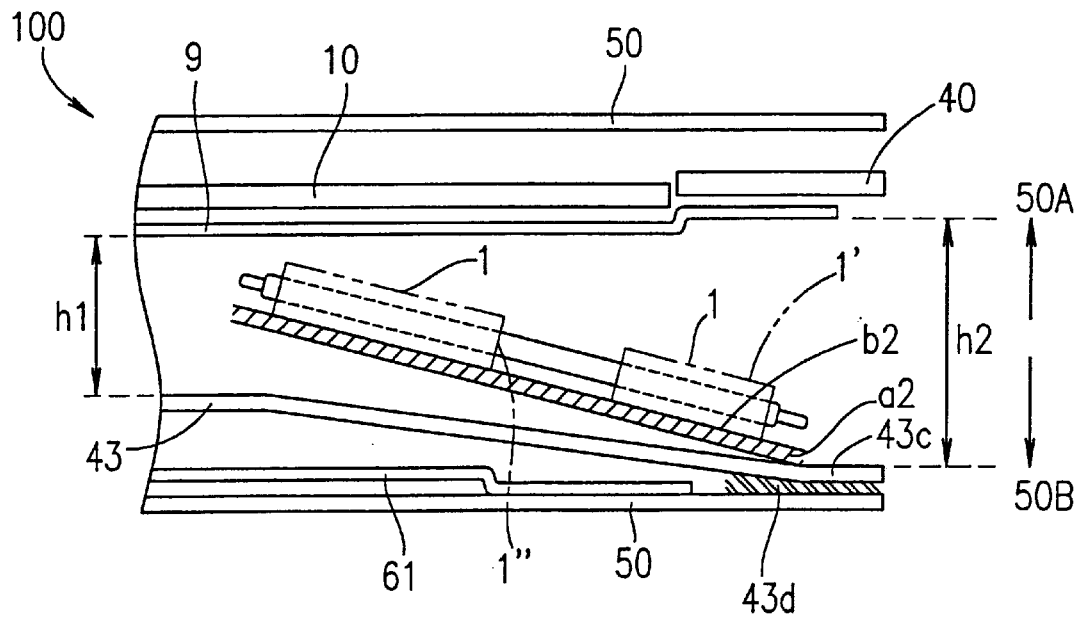
FIG. 7C is a cross-sectional view of the optical disk device 100 taken along line A—A in FIG. 7A.

Moreover, when the major shaft adjusting screw 25 in the major shaft adjusting mechanism 26 is turned so that the major shaft 20 moves in the direction along the arrow 20B as shown in FIG. 5, and the minor shaft adjusting screw 35 in the minor shaft adjusting mechanism 36 is turned so that the minor shaft 30 moves in the direction along the arrow 30B as shown in FIG. 6, in order to limit the tilt angle within the reference range, the optical pickup 1 moves along a moving orbital surface b2 as shown in FIG. 7C.

Herein, a space a2 formed generally in parallel with the moving orbital surface b2 is secured as a clearance. In the present embodiment, the tray cover 43 is slanted in the direction along the movement of the optical pickup 1 from the outer periphery to the inner periphery of the optical disk 10.

Therefore, the space a2 is formed between the optical pickup 1' and the tray cover 43, and even when the optical pickup 1 lowered by the major shaft adjusting mechanism 26 and/or the minor shaft adjusting mechanism 36 moves toward the outer periphery of the optical disk 10, the optical pickup 1 is smoothly transferred without contacting with the tray cover 43. As a result, the tilt angle is sufficiently adjustable.

Hereinafter, the ability to adjust the tilt angle of the optical disk device 100 of the present invention and that of the conventional optical disk device will be described in comparison with reference to FIGS. 8A and 8B.

Figure 8A:
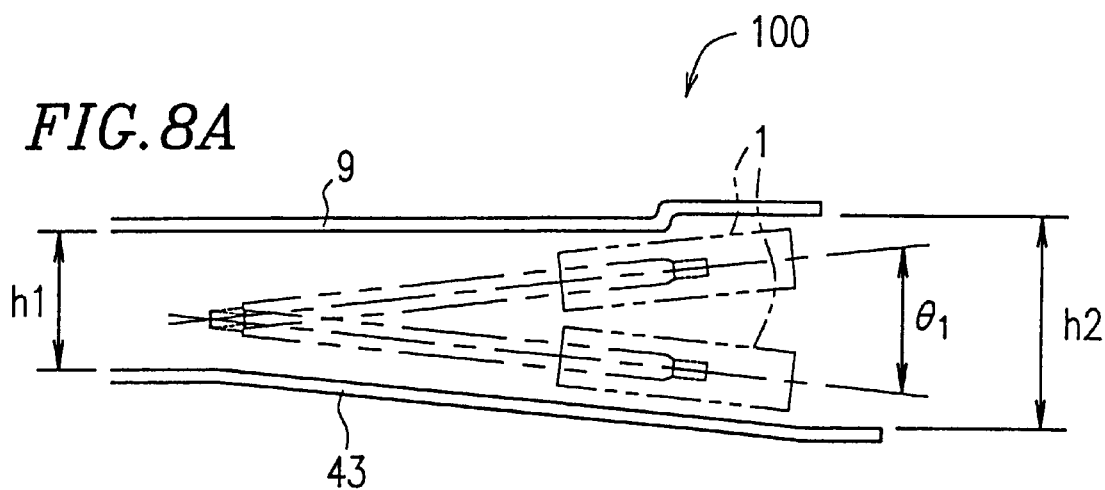
FIG. 8A is a cross-sectioinal view for describing an ability to adjust the tilt angle of the optical disk device 100.

FIG. 8A is a cross-sectional view for describing the adjusting ability of the optical disk device 100 of the present invention. FIG. 8B is a cross-sectional view for describing the adjusting ability of the conventional optical disk device.

The height h2 of the optical disk device 100, between the base cover 9 and the tray cover 43 adjacent to the outer periphery of the optical disk 10 is greater than a height h3 of the conventional disk device between the base cover 9 and the tray cover 43 adjacent to the inner periphery of the optical disk 10. Therefore, the optical disk device 100 can tilt the optical pickup 1 in a larger angle than the conventional optical disk drive.

As shown in FIG. 7B and 7C, since the tray cover 43 is tilted in the direction of arrow 50B, a portion of the tray cover 43 protrudes toward to the casing 50. In other words, a portion 43c of the tray cover 43, most distant from the surface of the optical disk 10 for recording and reproducing signals, in the direction perpendicular to the surface, is located outside the outer periphery of the optical disk 10. Hereinafter, such a portion of the tray cover 43 is referred to as a protruding portion 43c.

When the tray 40 is placed in the casing 50, the protruding portion 43c does not make contact with the casing 50, but a space 43d between the casing 50 and the protruding portion 43c is extremely narrow so that the interconnection element 61 cannot be provided therein. Therefore, in the present embodiment, the interconnection element (FPC) 61 is provided outside of the space 43d between the protruding portion 43a and the casing 50 when the tray 40 is placed in the casing 50 (FIGS. 3 and 4).

As described above, the interconnection element (FPC) 61 is bent in the deformed U-shape. Furthermore, as shown in FIG. 3, when the tray 40 is placed in the casing 50, the interconnection element (FPC) 61 is in the U-shape. One side and a bottom of the U-shape is pasted on the inside surface of the casing 50. The portion pasted on the inside surface of the casing 50 is referred to as a paste area 61a, which is indicated by slanted lines in FIG. 4. An unpasted side of the U-shape is turned over, and the end of the unpasted side of the U-shape is connected to the intermediate board 41. Furthermore, in order to be kept away from the space 43d between the protruding portion 43c and the casing 50, a round corner of the U-shape near the unpasted side is cut generally in a straight edge.

In the present embodiment, the state in which the height between the base cover 9 and the tray cover 43 adjacent to the outer periphery of the optical disk 10 is greater than the height between the base cover 9 and the tray cover 43 adjacent to the inner periphery of the optical disk 10 is also applied to FIGS. 9 through 16.

Figure 9:
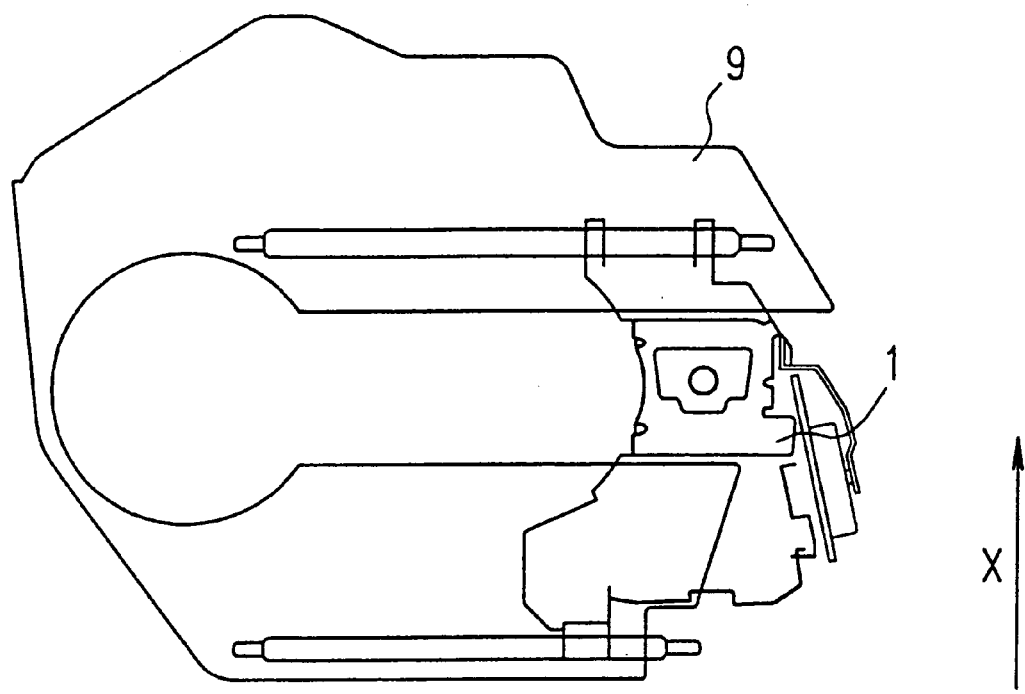
FIG. 9 shows an example of the shape of a base cover 9 in the present embodiment.
Figure 10:
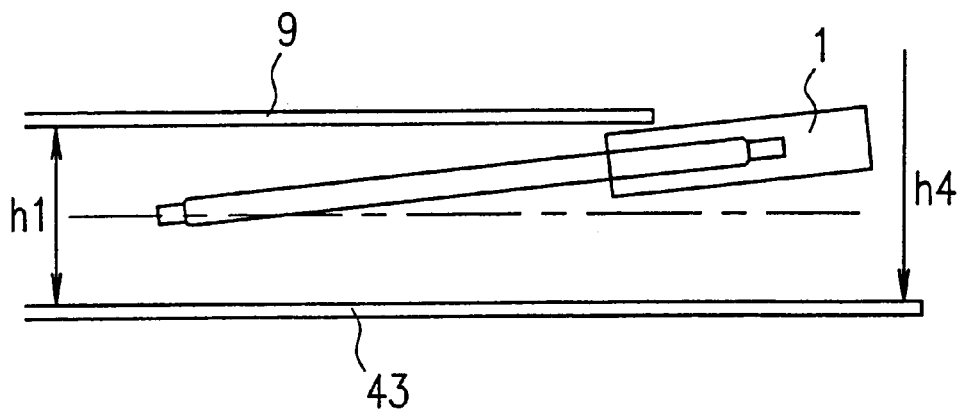
FIG. 10 shows the base cover 9 and the optical pickup 1 viewed along the arrow X in FIG. 9.

FIG. 9 shows an example of the shape of the base cover 9 in the present embodiment, together with the optical pickup 1. FIG. 10 shows the base cover 9 and the optical pickup 1 of the FIG. 9 viewed in the direction of arrow X. The height between the base cover 9 and the tray cover 43 adjacent to the inner periphery of the optical disk 10 is referred to as h1. The height between the base cover 9 and the tray cover 43 adjacent to the outer periphery of the optical disk 10 is referred to as h4. As shown in FIGS. 9 and 10, the base cover 9 does not exist adjacent to the outer periphery of the optical disk drive 10. In such a case, the height h4 is considered to be infinite. As a result, h4>h1 is obtained.

Figure 11:
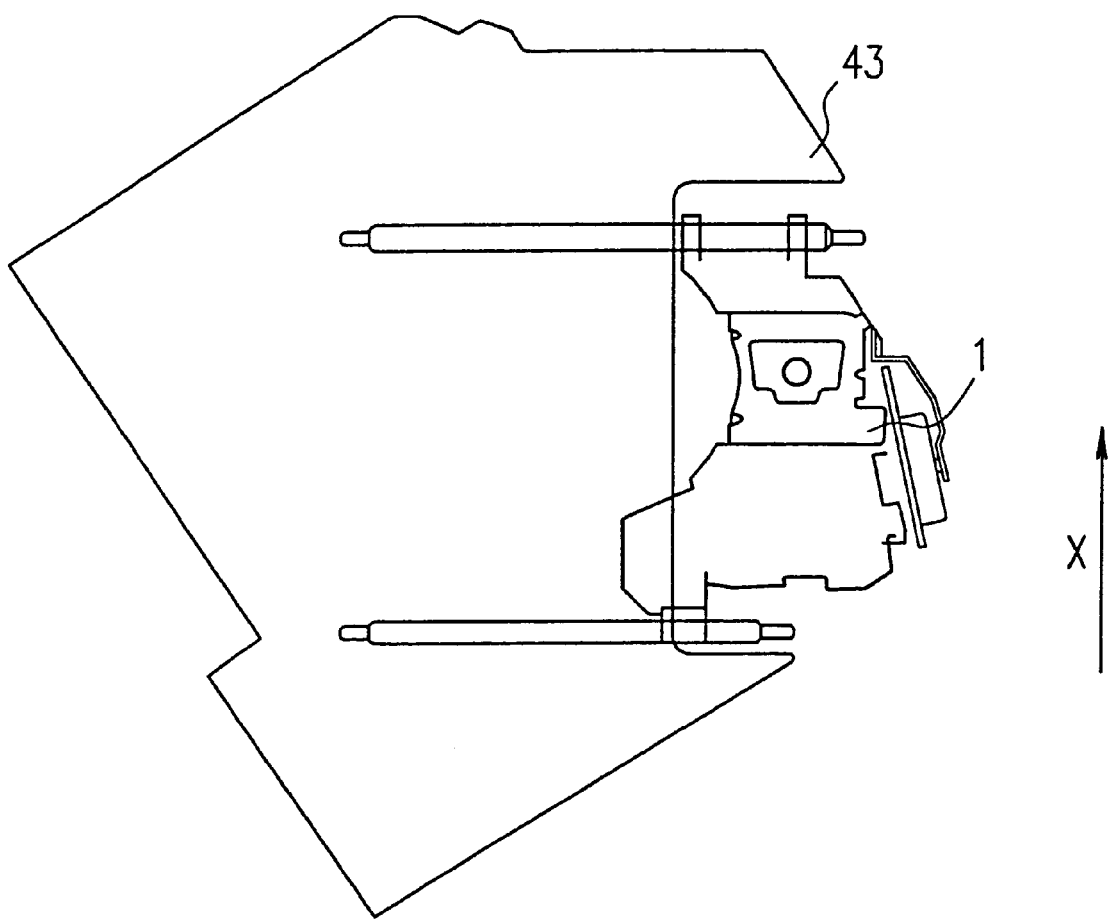
FIG. 11 shows an example of the shape of a tray cover 43 in the present embodiment.
Figure 12:
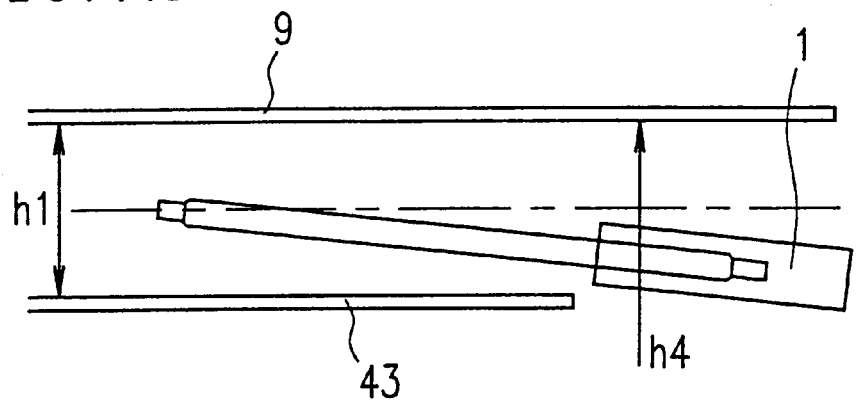
FIG. 12 shows the tray cover 43 and the optical pickup 1 viewed along the arrow X in FIG. 11.

FIG. 11 shows an example of the shape of the tray cover 43 in the present embodiment, together with the optical pickup 1. FIG. 12 shows the tray cover 43 and the optical pickup 1 of the FIG. 11, viewed in the direction of arrow X. The height between the base cover 9 and the tray cover 43 adjacent to the inner periphery of the optical disk 10 is referred to as h1. The height between the base cover 9 and the tray cover 43 adjacent to the outer periphery of the optical disk 10 is referred to as h4. As shown in FIGS. 11 and 12, the tray cover 43 does not exist adjacent to the outer periphery of the optical disk drive 10. In such a case, the height h4 is considered to be infinite. As a result, h4>h1 is obtained.

Figure 13:
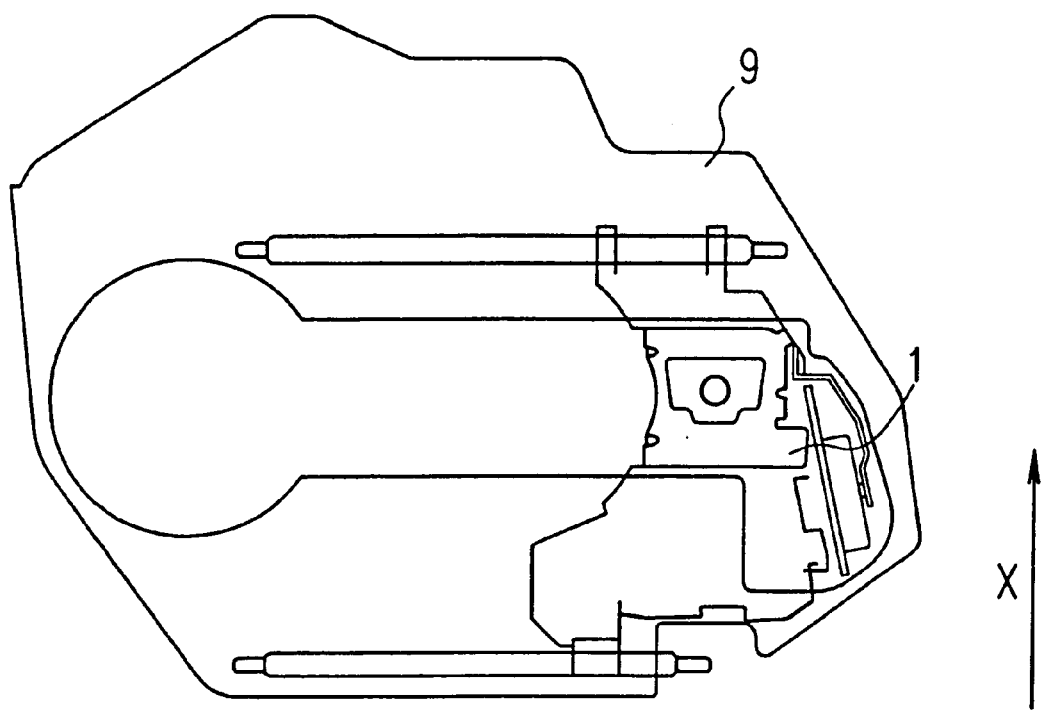
FIG. 13 shows another example of the shape of the base cover 9 in the present embodiment.
Figure 14:
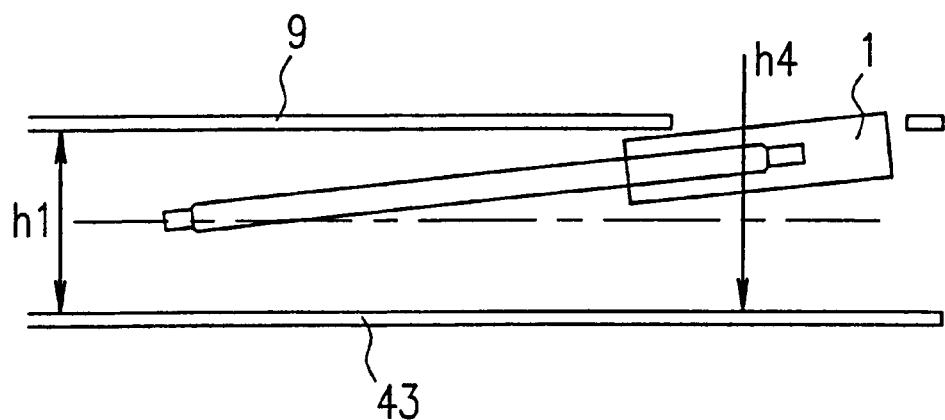
FIG. 14 shows the base cover 9 and the optical pickup 1 viewed along the arrow X in FIG. 13.

FIG. 13 shows another example of the shape of the base cover 9 in the present embodiment, together with the optical pickup 1. FIG. 14 shows the base cover 9 and the optical pickup 1 of the FIG. 13, viewed in the direction of arrow X. The height between the base cover 9 and the tray cover 43 adjacent to the inner periphery of the optical disk 10 is referred to as h1. The height between the base cover 9 and the tray cover 43 adjacent to the outer periphery of the optical disk 10 is referred to as h4. As shown in FIGS. 13 and 14, the base cover 9 has an opening in an area adjacent to the outer periphery of the optical disk drive 10. In such a case, the height h4 is considered to be infinite. As a result, h4>h1 is obtained.

Figure 15:
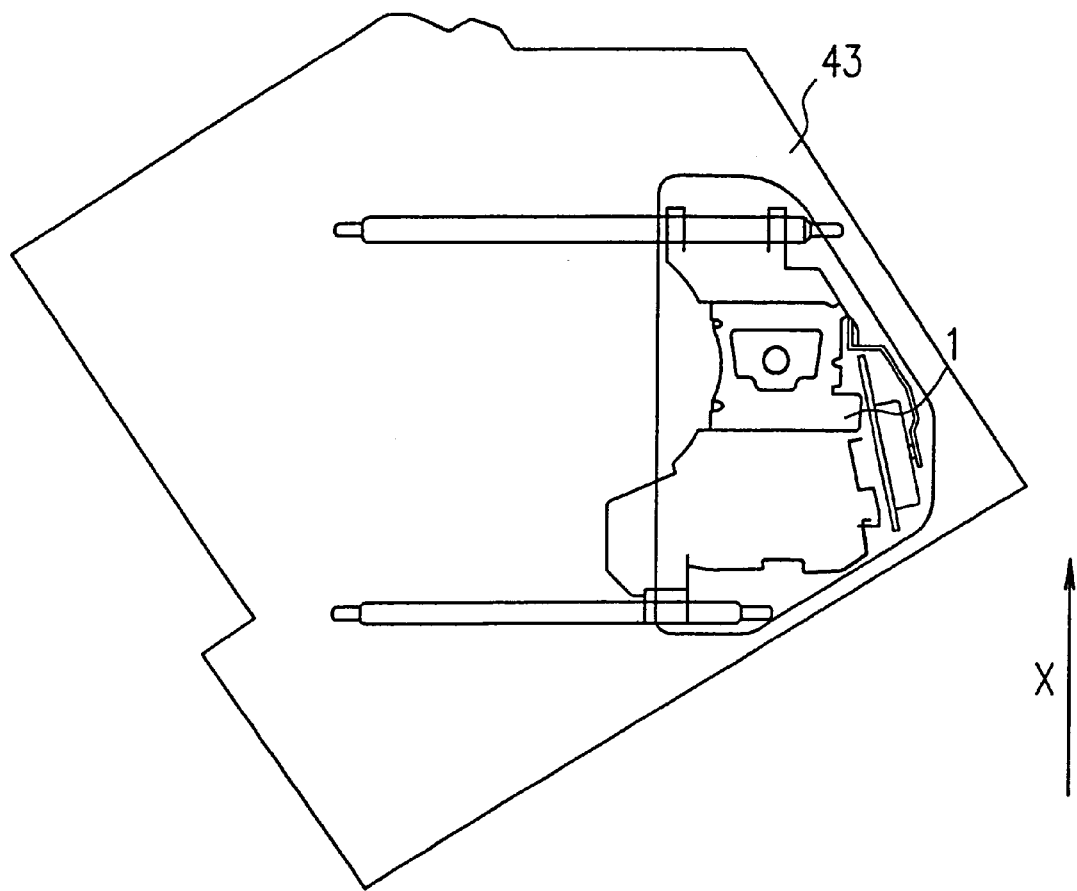
FIG. 15 shows another example of the shape of the tray cover 43 in the present embodiment.
Figure 16:
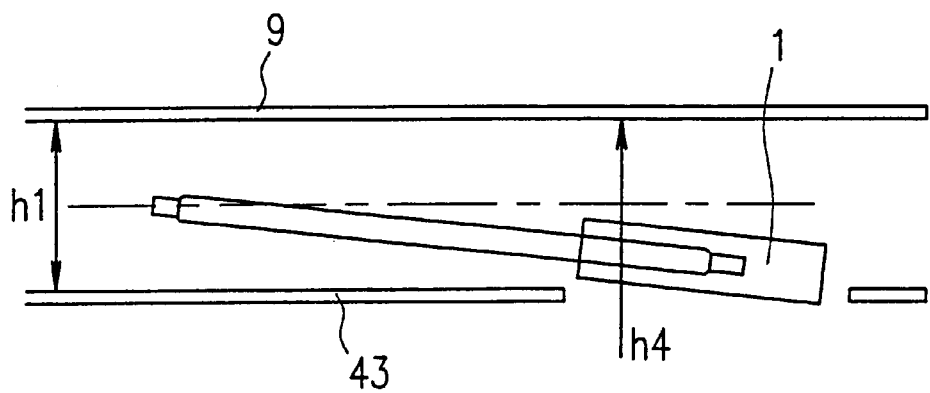
FIG. 16 shows the tray cover 43 and the optical pickup 1 viewed along the arrow X in FIG. 15.

FIG. 15 shows another example of the shape of the tray cover 43 in the present embodiment, together with the optical pickup 1. FIG. 16 shows the tray cover 43 and the optical pickup 1 of the FIG. 15, viewed in the direction of arrow X. The height between the base cover 9 and the tray cover 43 adjacent to the inner periphery of the optical disk 10 is referred to as h1. The height between the base cover 9 and the tray cover 43 adjacent to the outer periphery of the optical disk 10 is referred to as h4. As shown in FIGS. 15 and 16, the tray cover 43 has an opening in an area adjacent to the outer periphery of the optical disk drive 10. In such a case, the height h4 is considered to be infinite. As a result, h4>h1 is obtained.

The height between the base cover 9 and the tray cover 43 adjacent to the outer periphery of the optical disk 10 may be the height between the base cover 9 and the tray cover 43 at a position of the end of the optical pickup 1 away from the inner periphery of the optical disk 10, when the optical pickup 1 is placed so as to read/write data from/on the outer periphery of the optical disk 10.

Figure 8B:
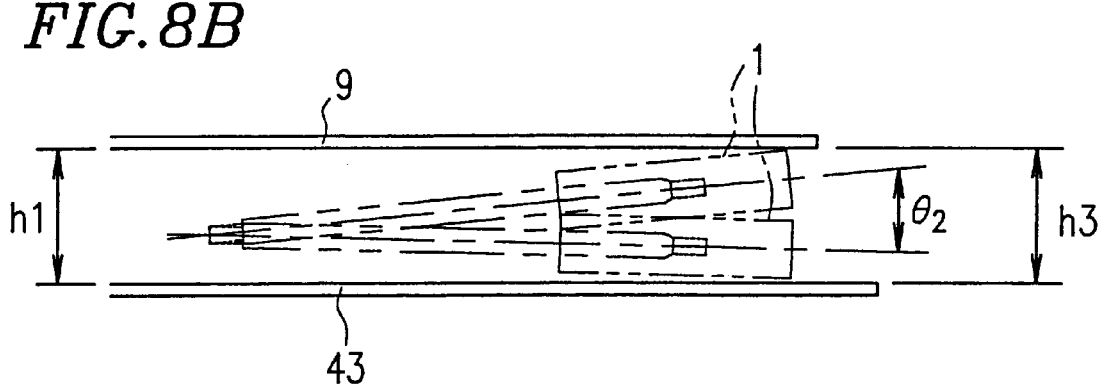
FIG. 8B is a cross-sectioinal view for describing an ability to adjust the tilt angle of a conventional optical disk device.

In the present embodiment, as long as the tilt angle is sufficiently adjusted, the tray cover 43 shown in FIG. 8B can be used in place of the tray cover 43 shown in FIG. 8A. Furthermore, in the present embodiment, as long as the tilt angle is sufficiently adjusted, the base cover 9 shown in FIG. 8B can be used in place of the base cover 9 shown in FIG. 8A.

In the present embodiment, the tray cover 43 shown in FIG. 11 or 15 can be used in place of the tray cover 43 shown in FIG. 8A.

In the present embodiment, the base cover 9 shown in FIG. 9 or 13 can be used in place of the base cover 9 shown in FIG. 8A.

In the present embodiment, the tray cover 43 shown in FIG. 11 or 15 can be used in place of the tray cover 43 shown in FIG. 10.

In the present embodiment, the tray cover 43 shown in FIG. 11 or 15 can be used in place of the tray cover 43 shown in FIG. 14.

In the optical disk device according to the present invention, the height between the upper cover and the lower cover adjacent to the outer periphery of the optical disk is greater than the height between the upper cover and the lower cover adjacent to an inner periphery of the optical disk. Therefore, a suitable clearance can be secured between the upper cover and the optical pickup or between the lower cover and the optical pickup, even when the optical pickup moves toward the outer periphery of the optical disk. Thus, according to the present invention, a thin optical disk device which operates normally is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk device, comprising:
    an optical pickup which performs at least recording or reproduction of signals on or from an optical disk;
    a guiding section which supports and guides the optical pickup along the radial direction of the optical disk;
    a base which supports the guiding section therein;
    an upper cover generally immediately adjacent the guiding section which protects one side of the guiding section;
    a lower cover generally immediately adjacent the guiding section which protects an opposite side of the guiding section; and
    wherein a height between the upper cover and the lower cover adjacent to an outer periphery of the optical disk is greater than a height between the upper cover and the lower cover adjacent to an inner periphery of the optical disk.

2. An optical disk device according to claim 1, wherein a portion of the lower cover most distant from a surface of the optical disk for recording and reproducing signals, in a direction perpendicular to the surface, is located adjacent to the outer periphery of the optical disk.

3. An optical disk device according to claim 1, further comprising a motor for rotating the optical disk.

4. An optical disk device, comprising:
    an optical pickup which performs at least recording or reproduction of signals on or from an optical disk;
    a guiding section which supports and guides the optical pickup along the radial direction of the optical disk;
    an upper cover which protects the guiding section;
    a lower cover which protects the guiding section, and
    a base which supports the guiding section therein;
    wherein a height between the upper cover and the lower cover adjacent to an outer periphery of the optical disk is greater than a height between the upper cover and the lower cover adjacent to an inner periphery of the optical disk, and
    the guiding section can adjust a tilt angle between an optical axis of the optical pickup and a recording surface of the optical disk.

5. An optical disk device, comprising:
    an optical pickup which performs at least recording or reproduction of signals on or from an optical disk;
    a guiding section which supports and guides the optical pickup along the radial direction of the optical disk;
    an upper cover which protects the guiding section;
    a lower cover which protects the guiding section; and
    a base which supports the guiding section therein;
    wherein a height between the upper cover and the lower cover adjacent to an outer periphery of the optical disk is greater than a height between the upper cover and the lower cover adjacent to an inner periphery of the optical disk,
    a portion of the lower cover most distant from a surface of the optical disk for recording and reproducing signals, in a direction perpendicular to the surface, is located adjacent to the outer periphery of the optical disk, and
    further comprising a tray on which the optical pickup, the guiding section, the upper cover, the lower cover and the base are mounted;
    casing which removably receives the tray; and
    an interconnection element which is provided in the casing;
    wherein the interconnection element is provided so that the interconnection element does not exist in the most distant portion of the lower cover when the tray is placed in the casing.

6. An optical disk device according to claim 5, wherein the interconnection element is bent in a U-shape when the tray is placed in the casing.

7. An optical disk device according to claim 5, wherein at least either a signal to be recorded in the optical disk or a signal to be reproduced from the optical disk is transmitted through the interconnection element.

8. An optical disk device, comprising:

an optical pickup which performs at least recording or reproduction of signals on or from an optical disk;

a guiding section which supports and guides the optical pickup along the radial direction of the optical disk;

an upper cover which protects the guiding section;

a lower cover which protects the guiding section; and a base which supports the guiding section therein;

wherein a height between the upper cover and the lower cover adjacent to an outer periphery of the optical disk is greater than a height between the upper cover and the lower cover adjacent to an inner periphery of the optical disk, and the upper cover has a step in an area outside the outer periphery of the optical disk.

\* \* \* \* \*